(12) United States Patent
Smathers et al.

(10) Patent No.: US 11,567,707 B2
(45) Date of Patent: Jan. 31, 2023

(54) RESPONSIVE PRINTING DEVICE

(71) Applicant: Hewlett-Packard Development Company, L.P., Spring, TX (US)

(72) Inventors: Kevin Smathers, Palo Alto, CA (US); Bradley Wittke, Palo Alto, CA (US); Mithra Vankipuram, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/971,872

(22) PCT Filed: Apr. 23, 2018

(86) PCT No.: PCT/US2018/028908
§ 371 (c)(1),
(2) Date: Aug. 21, 2020

(87) PCT Pub. No.: WO2019/209254
PCT Pub. Date: Oct. 31, 2019

(65) Prior Publication Data
US 2021/0081151 A1   Mar. 18, 2021

(51) Int. Cl.
*G06F 3/12*   (2006.01)
*H04N 1/00*   (2006.01)

(52) U.S. Cl.
CPC .......... *G06F 3/1205* (2013.01); *G06F 3/1204* (2013.01); *G06F 3/1253* (2013.01); *H04N 1/00403* (2013.01)

(58) Field of Classification Search
CPC combination set(s) only.
See application file for complete search history.

(56) References Cited

U.S. PATENT DOCUMENTS

| | | | |
|---|---|---|---|
| 6,889,190 B2 | 5/2005 | Hegarty |
| 7,722,172 B2 | 5/2010 | Silverbrook |
| 9,070,142 B2 | 6/2015 | Krone et al. |
| 9,501,891 B2 | 11/2016 | Lozano |
| 9,513,851 B2 | 12/2016 | Bell et al. |
| 2001/0029531 A1 | 10/2001 | Ohta |
| 2007/0222847 A1 | 9/2007 | Silverbrook |

(Continued)

FOREIGN PATENT DOCUMENTS

| | | |
|---|---|---|
| CN | 104553359 | 4/2015 |
| CN | 105094717 | 11/2015 |

(Continued)

*Primary Examiner* — Helen Zong
(74) *Attorney, Agent, or Firm* — Michael Dryja

(57) ABSTRACT

Examples disclosed herein relate to responsive printing. An example device includes a processor, a memory device, and a printer for physical printing of a content section of an output object following a user setting and an instruction for the output object to be printed. In an example, the device may also include a microphone to detect an audio input and a camera to detect an image input. Further, in the example, the audio input detected by the microphone and the image input detected by the camera are both used by the processor executing instructions from the memory device in providing a content section of the output object, providing the user setting, and providing instructions to the printer for the content section of the output object to be printed.

11 Claims, 9 Drawing Sheets

(56) References Cited

U.S. PATENT DOCUMENTS

| | | | | |
|---|---|---|---|---|
| 2012/0092728 | A1* | 4/2012 | Aoki | H04N 1/00933 |
| | | | | 358/1.15 |
| 2014/0126000 | A1* | 5/2014 | Chong | G06K 15/027 |
| | | | | 358/1.8 |
| 2015/0036174 | A1* | 2/2015 | Pettis | G06F 3/1288 |
| | | | | 358/1.15 |
| 2015/0049363 | A1* | 2/2015 | Nishiyama | G06F 3/1236 |
| | | | | 358/1.15 |
| 2015/0281521 | A1* | 10/2015 | Takeuchi | H04N 1/00517 |
| | | | | 358/1.14 |
| 2016/0016362 | A1* | 1/2016 | Kim | G05B 19/4099 |
| | | | | 700/98 |
| 2016/0127582 | A1* | 5/2016 | Sawa | H04N 1/442 |
| | | | | 358/1.14 |
| 2016/0182757 | A1* | 6/2016 | Yoo | H04N 1/33369 |
| | | | | 358/1.15 |
| 2016/0182762 | A1* | 6/2016 | Eum | H04N 1/00307 |
| | | | | 358/1.14 |
| 2016/0224963 | A1* | 8/2016 | Tsuchida | G06K 7/1404 |
| 2017/0221091 | A1* | 8/2017 | Gupta | G06Q 30/0244 |
| 2019/0349488 | A1* | 11/2019 | Chitpasong | H04N 1/00488 |
| 2020/0151528 | A1* | 5/2020 | Chen | G06K 19/06037 |
| 2021/0343116 | A1* | 11/2021 | Nguyen | G07F 17/3225 |

FOREIGN PATENT DOCUMENTS

| | | |
|---|---|---|
| JP | 2005100415 | 4/2005 |
| RU | 2313823 | 12/2007 |
| RU | 2641473 | 1/2018 |
| WO | WO-2017088670 | 6/2017 |

\* cited by examiner

100

300

500

700

RESPONSIVE PRINTING DEVICE

BACKGROUND

A printer may be used in a variety of form factors including a printer that rests on a desk, a handheld printer, a larger office printer that is rests on the floor. Printers can be used to print labels, nametags, price tags, photographs, business cards, and any number of documents on paper and a number of other materials.

DESCRIPTION OF THE DRAWINGS

Certain examples are described in the following detailed description and in reference to the drawings, in which.

DETAILED DESCRIPTION

This present disclosure relates to responsive printing. Responsive printing refers to printing without the need for keyboard, mouse, touch, button, or stylus tool based input. For example, responsive printing may avoid the use of a user pressing with a finger or stylus a button or screen or applying force to an input/output interface of a printer or computer controlling a printer. Instead, a printer may be controlled through voice commands, audio signals, image input captured by the printer, or multiple images strung together as a video for input. Through these non-contact means of printer control, a printer may adjust the content of what is to be printed, the format of what is to be printed, the timing of when a printer prints, and other specifics as discussed herein.

The functionalities discussed below may be controlled through a digital assistant hosted within a printer computing device. As a digital assistant may perform many of the tasks and act as feedback for the user, a speaker may also be present in the printer device. The digital assistant may make use of all resources available to it including the internet, decentralized or remote logic and processing, use of a local or remote contact directory for a user. The printer device may include a storage for a printed medium and ink. The digital assistant may make use of third party modules in order to perform other functions on the voice and text input including the translation, calculation, and key-value pairing disclosed below.

Figure 1:
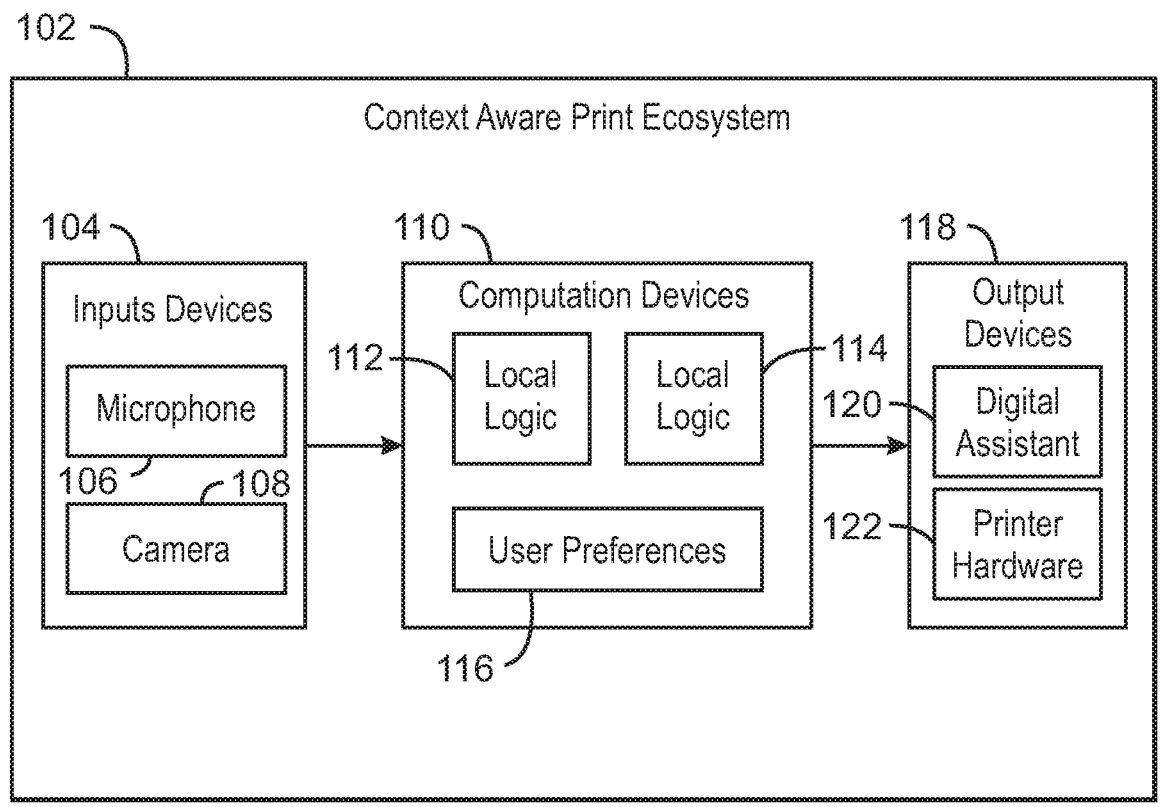
FIG. 1 is a block diagram of an example ecosystem for a responsive printing device.

FIG. 1 is a block diagram of an example ecosystem 100 for a responsive printing device. A context aware print ecosystem 102 refers generally to both physical hardware and processes that can take place for responsive printing to be implemented. In an example, the devices in an ecosystem may be part of a single, integrated, unit, or may be separate devices coupled through interface ports. A context aware print ecosystem 102 may be context aware as it adjusts its printing based on a context determined based on input devices 104.

The input devices 104 can include audio input that is detected by a microphone 106. The microphone may be detect a range of physical sound waves in a human audible range. The microphone may detect a range of physical sound waves beyond the human audible range. For example, if a signal were made by another device in the room to print, a signal may be passed out of band and out of human hearing instructing a device to print. The non-human audible nature may aid in avoiding distractions to a human user in the room. The input devices 104 can also be an image that is detected or captured by a camera 108. The camera 108 may detect a range of electromagnetic radiation waves in a human visible range. The camera 108 may detect a range of electromagnetic radiation beyond the human visible range. This may aid in out-of-band communication that would not be distracting to a human in the room. In an example, a device may send an infrared signal to a printing device to print.

A context aware print ecosystem 102 can include sending the input devices 104 for computation devices 110. These computation devices 110 can take place local to a printing device, using local logic 112. As used herein, local refers to files, devices, and other resources within the physical device where the microphone 106 and camera 108 that are sending input devices 104 for computing are located. Resources located at other nodes on the network are remote. Computation devices 110 may include access or use of logic that is initially remotely located, i.e. remote logic 114. These computations may take the input and determine user preferences 116. In an example, there may be a default user preference stored as a user preference 116. In an example, user preferences adjust the way content is printed including alterations to font, font size, printer used, double-sided or single sided, material used for printing, color of ink, spacing, formatting, and other print options.

The computation devices 110 that may take place may include a determination of a context. In an example, an input may include an audio request to "print a label for this" and the computation devices 110 may determine that as the term "this" is unclear, the input from the camera 108 may be analyzed to determine what us in the line of sight of the printer. This can include use of computer vision, image analysis, and image matching computations, among others. In an example, the computation devices 110 may include an analysis of speech detected by the microphone 106. Further computation devices 110 and analysis based on the input devices 104 are discussed in other figures includes below.

Based on the input devices 104 and the computation devices 110 an output is generated 118. This output devices 118 may include a digital file for printing that is generated by a digital assistant 120. In an example, the printer itself may be addressed and controlled or initially put into a listening mode based on the commands of the digital assistant 120. In an example, the digital assistant 120 can have a specific activation word that triggers the recording an analysis of the audio or image near the printing device. The digital assistant 120 may have access to both the computation devices 110 and the printer hardware 122. In an example, the digital assistant may send a digital file to the printer hardware 122 for printing. In an example, the digital assistant waits for an instruction to send the digital file to the print hardware until this instruction is detected in input recorded with a microphone. In response to receiving instructions from the digital assistant 120 to print an item, the printer hardware 122 prints the item.

In an example of a computation performed to generate an output devices 118 for printing, the computation devices 110 may include image retrieval. Based on the input devices 104, an instruction given to the system may include an instruction to include an image in the output devices 118 to be printed. If an image is present locally, then the image may be sent to the digital assistant 120 or printer hardware 122 for printing. In an example where computation devices 110 can rely on connection to remote nodes and devices, a digital assistant 120 may be able to retrieve images from a network such as the internet in order to satisfy print job requests.

Figure 2:
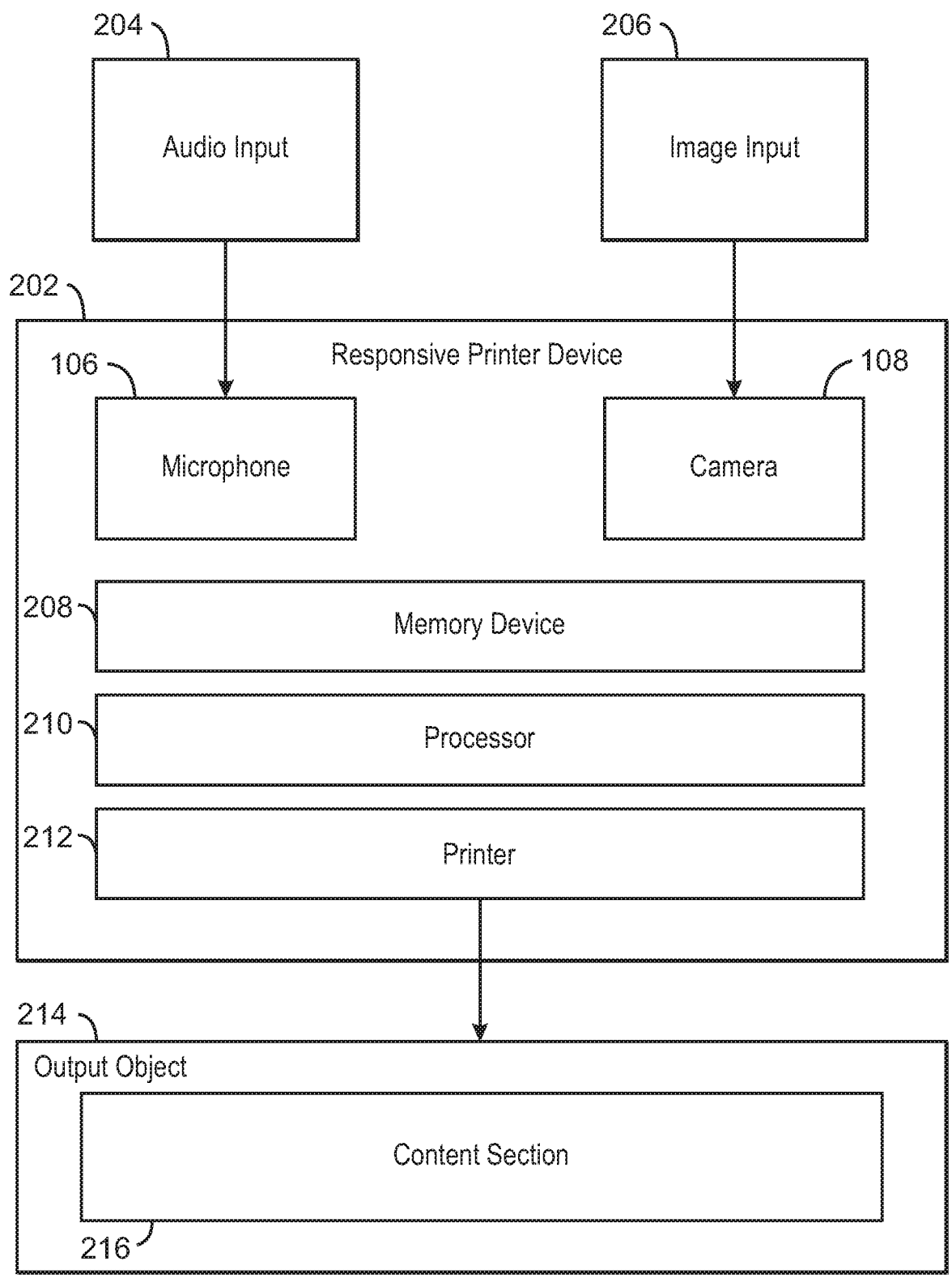
FIG. 2 is a block diagram of an example system for responsive printing.

FIG. 2 is a block diagram of an example system 200 for responsive printing. Like numbered items are as discussed with respect to FIG. 1.

A responsive printing device 202 may take inputs in the form of audio input 204 and image input 206. As used herein, audio input 204 can include human speech or a tonal, rhythmic, or other audible inputs that are not human generated audio. Audio input 204 may not be within a human hearing range for example, generates by other units for communications. As used herein, image input 206 can be input captured by a camera such as a photograph. Image input 206 can include a string of images in a video form. Image input 206 can include human visible or human invisible electromagnetic radiation such as infrared light.

The responsive printer device 202 can include a microphone 106 and a camera 108 to detect the audio input 204 and the image input 206. The responsive printer device 202 can include a memory device 208 to store the audio input 204 and the image input 206. The memory device 208 may store instructions that may be executed by the processor 210. The memory device 208 and the processor 210 may together implement instructions that use the input from the audio input 204 and the image input 206 to generate an output object 214. The content of an output object is shown in a content section 216 of the output object. In an example, the output object 214 is a digital file such as a pdf and the printer 212 is a digital tool. In an example, the output object 214 is a physical medium such as paper and the content section 216 includes the words to be printed on the output object 214. For example, a person could say print a label for "flour" and a label for flour would be printed. In an example, the person could say, print me a label for "flour" and make the font large and bold and the printer would print the word "flour" with font settings categorized as a large font with a boldness font adjustment.

Figure 3:
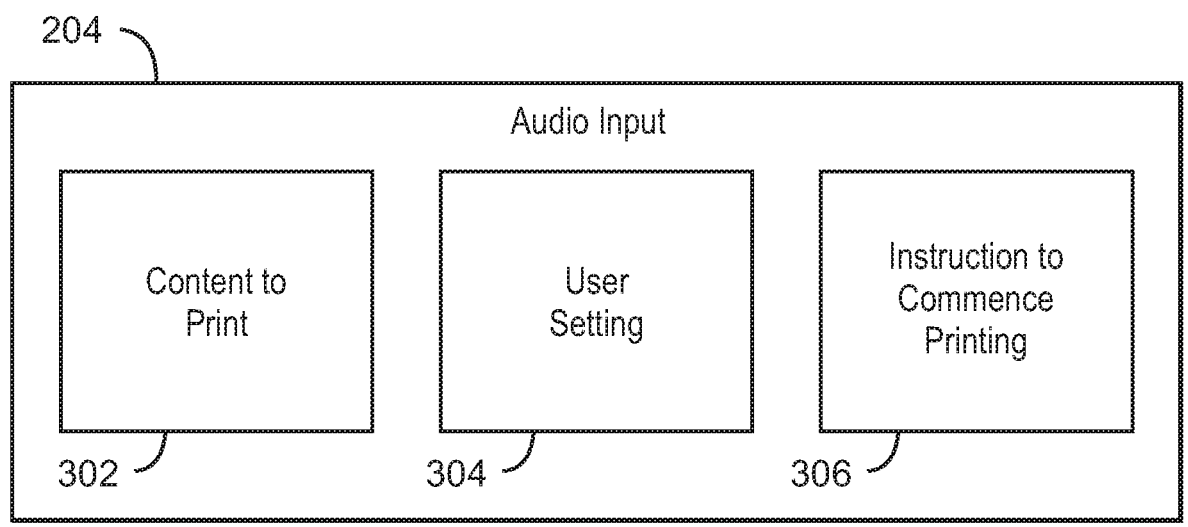
FIG. 3 is a block diagram of an example audio input.

FIG. 3 is a block diagram of an example 300 audio input. Like numbered items are as described above. In the responsive printer device, the audio input 204 may provide the content to print 302, the user setting 304, and the instruction to commence printing 306. The content to print 306 can include a transcription of any detected words of speech detected and identified from audio input 204. For example, a user may generate what is printed on a label using their speech. In an example the content to print 306 can include a local file that an instruction given through audio input was instructed to retrieve and print. In an example, the content to print 306 can include an instruction to interact with image input in order to images or output values to be printed. The content to print can be any other number of literal, interpretive, or instructions that indicate the subject matter that is to be printed. As discussed above, for a system with connection to the internet or other networks, the device may request the printing of images as the content to print 302. If these images are not producible locally, then a connection may be formed with a network to retrieve a desired image from another system.

The user setting 304 indicates how the content to be printed 302 will be printed. In an example where the content is text, the user setting 304 may refer to text, spacing of characters, lines, paragraphs, pages. The user setting 304 may refer to printer selection, medium selection, ink selection, number of copies. The user setting 304 may refer to indicating a location to print within a shared network of printer hardware. The user setting 304 may indicate a form factor of the item to be printed such as business cards, flyers, labels, return addresses, legal-sized paper, or any other number of settings related to printing. In an example, the user setting 304 included in the audio input 204 may update to currently existing user settings.

In an example, a user setting may be updated with a specific customization when the audio input includes speech for example, "I'd like a label that says, 'Sprinkles', in all caps with a san sheriff font similar to Tacoma and in pastel multi-color". When the printing device has internet connectivity the audio input include instructions to add a picture, the printing device may request an image from a database on the internet to include in the output image.

In an example, existing user settings may be default settings previously set through audio input 204. Existing user settings may have been set as manufacturing of a printer storing settings. In response to the audio input 204 including instructions for the user setting 304 of a current print job, the content to print 302 can be modified by the user setting 304. In an example, the audio input 204 can include user setting 304 that indicate that a new default user setting is being established by the user setting 304 of the audio input 204. A user setting 304 may also be communicated in a more abstract way in the audio input 204. For example, an audio input requesting that the content to printer 302 is formatted "in a wedding style" or "in a cheerful font with a large size" these terms and phrases may be analyzed and adjusted to correspond to specific settings that are associated with these phrases. For example, a wedding style may be set to only write in a cursive font. In an example, a cheerful font may refer to fonts and formats that have been pre-identified as being cheerful.

The instruction to commence printing 306 may be a spoken command that is detected in the audio input 204 for the printer to commence printing of the content to print 302 according to the user setting 304. In an example, the instruction to commence printing may audio input 204 that is not speech. In an example the instruction to commence printing 306 may be an instruction for a specific time of day, or a specific time duration after the instruction is provided. In an example, the print command can be the word "print" In an example, the printer provide feedback or follow up questions if additional questions are needed to clarify the user settings 304. For example, "would you like an image to be found and added to your text for printing?"

Figure 4:
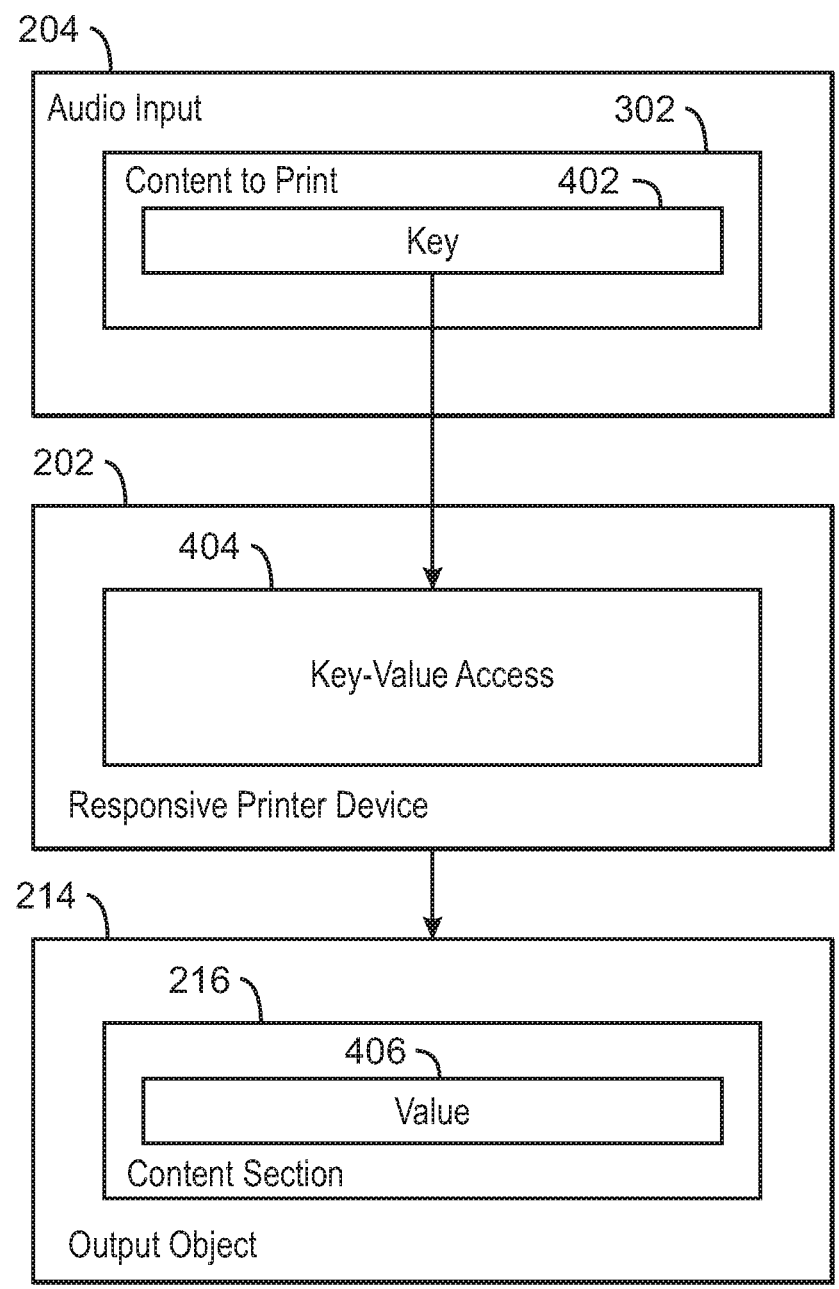
FIG. 4 is a block diagram of an example for key-value pair responsive printing.

FIG. 4 is a block diagram of an example for key-value pair responsive printing 400. Like numbered items are as described above with respect to FIGS. 2 and 3.

In an example, instructions for content to print 302 may be included in the audio input 204. In order to avoid strict interpretation of commands, a responsive printing device 202 may allow for flexibility in interpreting audio input 204. For example a key 402 of a key-value pair may be included in the audio input 204 as the content to print 302. For illustrative purposes, one example of a keyword could be "brother" for a key-value pair of "Brother: Dan."

In an example a specific user is logged in for a responsive printing device 202. When a user is known to the responsive printing device 202 a number of relationships or associations for that user may be known, created, synchronized from other systems, or generated over time. These relationships or associations may be stored in the form of key-value pairs, for example, "favorite color: green" or "that pattern I like: plaid". In this way, when an audio input 204 is provided including a key 402 value, this key may be checked using a key-value access 404 by the responsive printing device 202. In response to a key-value pair being found based on a key-value access, responsive printing device 202 may substitute the key for the value 406 when printing the output object.

Taken together, the key-value pair system may increase the ability of a user to speak naturally and for a printer to use the context in order to determine what to print. The context may include both audio input 204 and image input 206. For example, an image input 206 may include a camera capturing the image of the face of the user providing audio input 204. The image of the user face may have facial recognition applied to it in order to alter the key-value pairs, or other contextual tools specifically tailored for that user. In this example, two users may each separately and audibly request mailing labels be printed for their brother Dan, however, based on the context of who was asking, as determined through image analysis, different labels would be printed for each user. In an example the key-value access 404 may occur locally, remotely, or may include a combination of local and remote operations.

As a note, the key-value pairs may include context specific information for a user, but may also be used for printing data generally. In an example, if an audio input for "print current time" a key-value access may result in a key-value pair that links the request for "current time" to a read out of the current time tracked by a processor within the system of the printer device.

Figure 5:
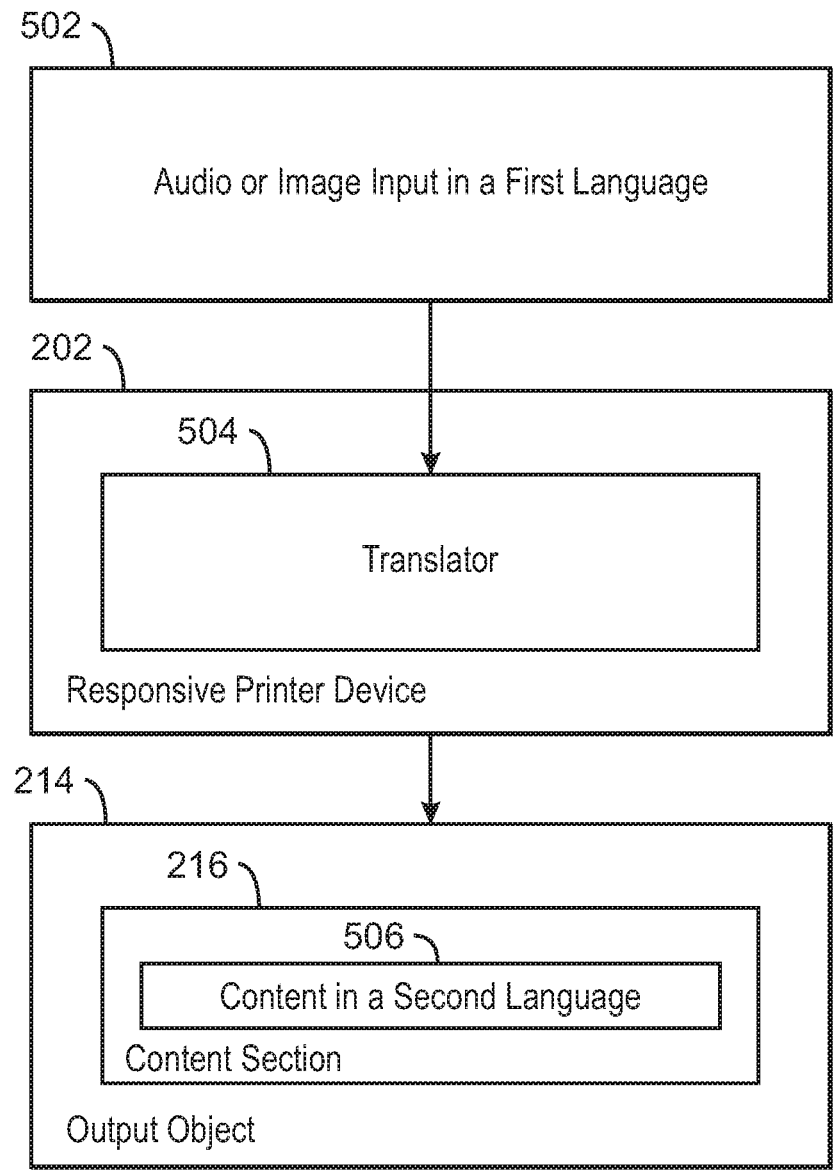
FIG. 5 is a block diagram of an example for a translation system in responsive printing.

FIG. 5 is a block diagram of an example for a translation system 500 in responsive printing. Like numbered items are as discussed above with respect to FIG. 2. The responsive printer device 202 may be used to translate input it receives into a printed output.

The audio or image input in a first language 502 may be received by the responsive printer device 202 and sent to the translator 504. In an example, the input is an image input with text that is in a first language. In order to be analyzed and translated, the image text must be read through computer vison technology or optical character recognition technology. In an example, the input is an audio sound that is speech in a first language that may have to be transcribed by software. As discussed above, the audio input or image input maybe used either separately or together for analysis and determination of a context for printing. In an example, context of printing can include a determination of what language the input is written or spoken in.

Once received, in a transcribed or recognized format as plain text, the translator 504 may translate the first language into a second language. In an example, a key-value pair access to replace a key value with a pair may be combined with this translation either in the first language or the second language and prior to or after the translation. For example, a request may be made in Spanish that the label brother print the address for "hermano," the translation may translate to "brother" and then a key-value access may be performed to note that the brother in a particular context is "Dan."

The translated text is the content in a second language 506 that is inserted into the content section 216 of the output object 214 printed by the responsive printer device. In an example, an image of a business card in English may be detected by the camera for analysis and use as input. In response to an audio input to commence printing a translation of that card, a responsive printer device 202 may translate the text to a second language, e.g. Mandarin Chinese, and attempt to keep other scanned design elements of the card including layout as a stored user settings.

Figure 6:
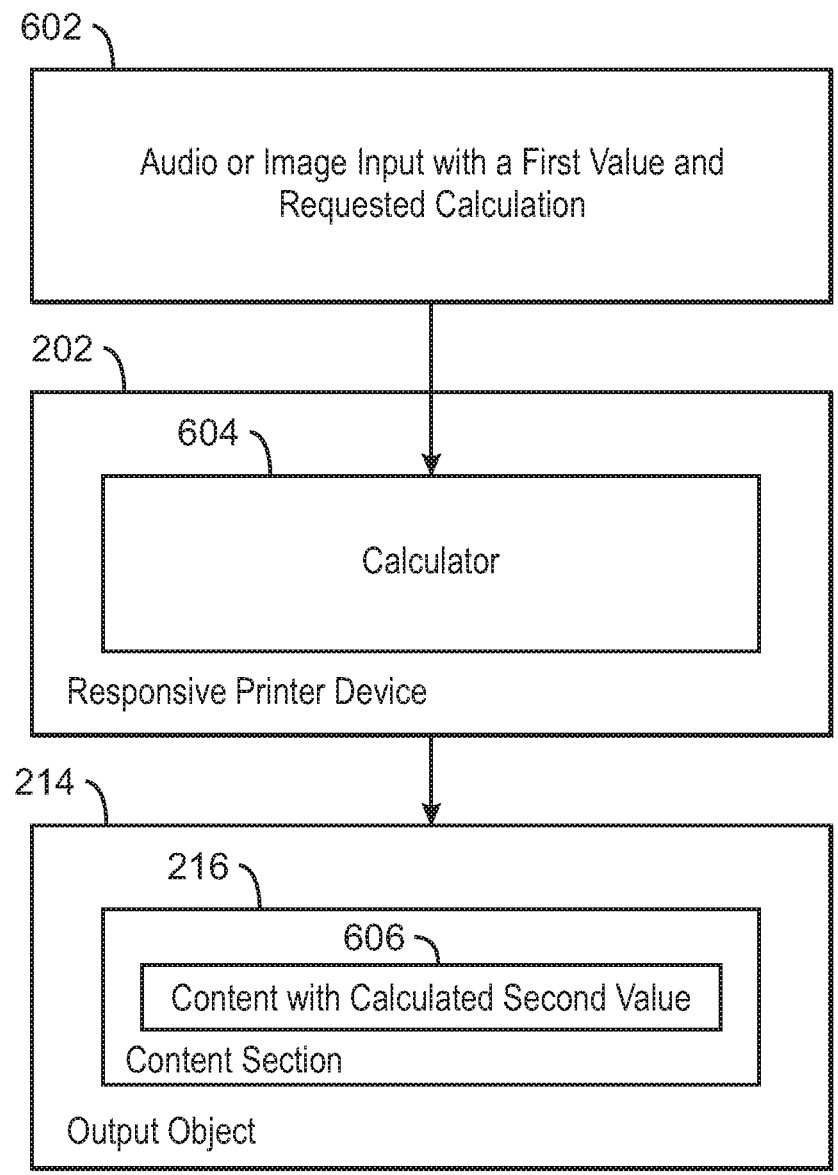
FIG. 6 is a block diagram of an example for a calculating system in responsive printing.

FIG. 6 is a block diagram of an example for a calculating system 600 in responsive printing. Like numbered items are as discussed above with respect to FIG. 2.

The responsive printer device 202 can receive audio or image input with a first value and requested calculation 602. The calculator 604 may then perform the requested calculation on the first value and provide the calculated value to the content section 216 of the output object 214 for printing. The content with the calculated second value 606 can be a re-calculated price that has been reduced or raised by a certain value or percentage. The content with the calculated second value 606 can be a distance with an additional buffer distance added. The content with the calculated second value 606 can be a date calculation, e.g., a food expiration date to print onto a label where the audio input is a request to print the date 2 weeks from the time of the request.

Figure 7:
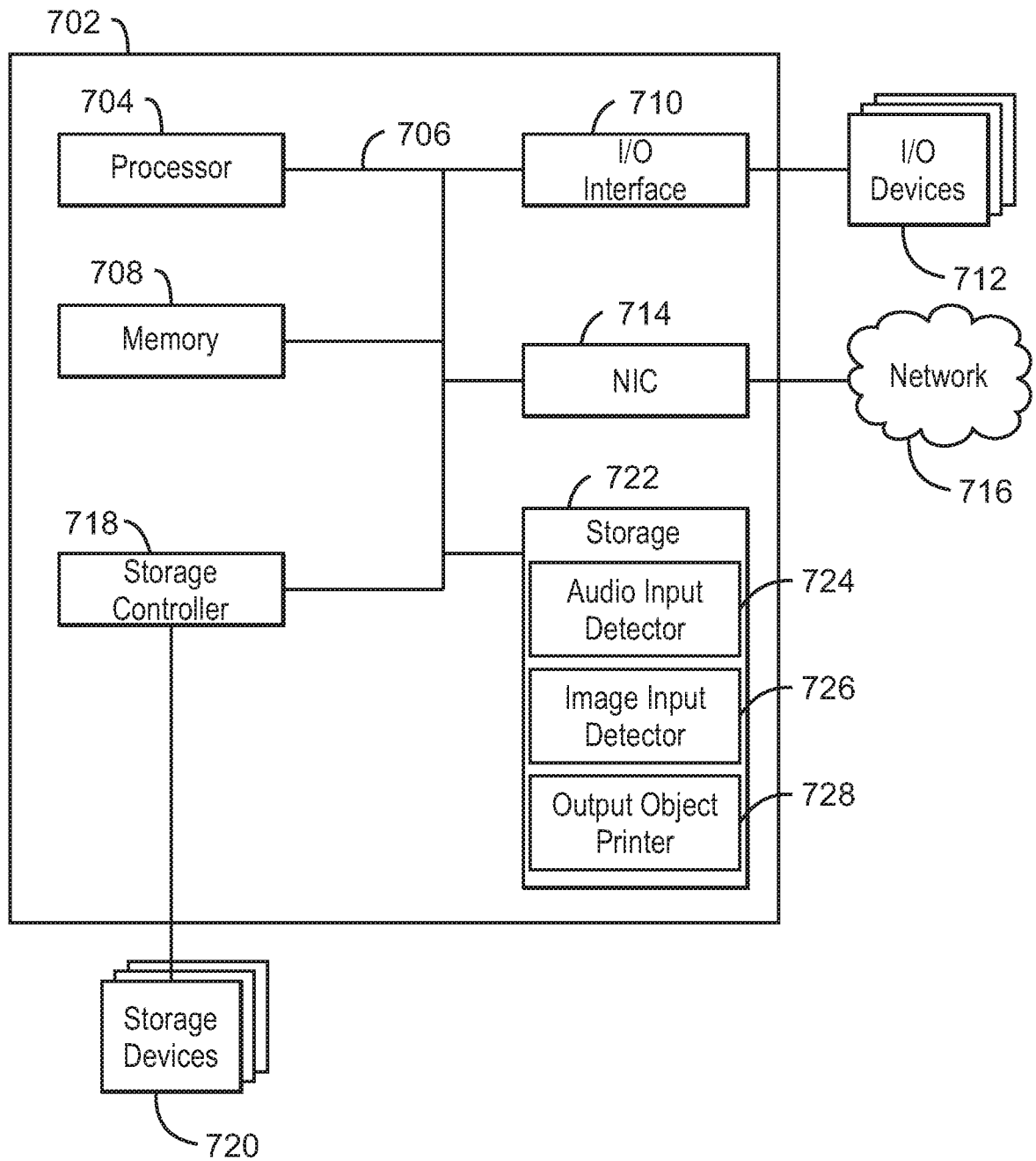
FIG. 7 is a block diagram of an example system for responsive printing.

FIG. 7 is a block diagram of an example system 700 for responsive printing. The system for responsive printing can be a standalone computing device 702 for printing or a printer connected to a computing device 702, including a virtual reality or augmented reality headset, glasses, or projection, as well as a desktop computer, laptop, tablet, mobile phone, smart device, or other computing devices. The computing device 702 for printing may also be a handled printer including a label maker, price tag, generator, and other handheld form factors. The system 700 for responsive printing includes at least one processor 704. The processor 704 can be a single core processor, a multicore processor, a processor cluster, and the like. The processor 704 can may include a graphics processing unit (GPU), an application specific integrated circuit (ASIC), or a field programmable gate array (FPGA), or any combination thereof to implement video processing. The processor 704 can be coupled to other units through a bus 706. The bus 706 can include peripheral component interconnect (PCI) or peripheral component interconnect express (PCIe) interconnects, Peripheral Component Interconnect eXtended (PCIx), or any number of other suitable technologies for transmitting information.

The computing device 702 can be linked through the bus 706 to a memory 708. The system memory 708 can include random access memory (RAM), including volatile memory such as static random-access memory (SRAM) and dynamic random-access memory (DRAM). The system memory 708 can include directly addressable non-volatile memory, such as resistive random-access memory (RRAM), phase-change memory (PCRAM), Memristor, Magnetoresistive random-access memory, (MRAM), Spin-transfer torque Random Access Memory (STTRAM), and any other suitable memory that can be used to provide computers with persistent memory.

The processor 704 may be coupled through the bus 706 to an input output (I/O) interface 710. The I/O interface 710 may be coupled to any suitable type of I/O devices 712, including input devices, such as a mouse, touch screen, keyboard, display, VR/AR controllers through body movement detection cameras, handheld controllers and the like. The I/O devices 712 may be output devices such as a display, VR/AR goggles, a projector, and the like. As discussed above, this disclosure shows technique that may include reducing or omitting the utility of a touch based input/output interface, and accordingly the I/O interface can be, in some cases, removed from a device or limited in the power it is provided. The removal of a touch-based I/O interface can save space, allow and adjustments in design. Reducing power consumption by reducing dependence and powering of a physical touch-based I/O input can improve the overall function of the computer and printer through more economical use of power, or in cases of battery operated devices, improved battery life.

The computing device 702 can include a network interface controller (NIC) 714, for connecting the computing device 702 to a network 716. In some examples, the network 716 can be an enterprise server network, a storage area network (SAN), a local area network (LAN), a wide-area network (WAN), or the Internet, for example. The processor 704 can be coupled to a storage controller 718, which may be coupled to one or more storage devices 720, such as a storage disk, a solid state drive, an array of storage disks, or a network attached storage appliance, among others.

The computing device 702 can include a non-transitory, computer-readable storage media, such as a storage 722 for the long-term storage of data, including the operating system programs and user file data. The storage 722 can include local storage in a hard disk or other non-volatile storage elements. While generally system information may be stored on the storage 722, in this computing device 702, the program data can be stored in the memory 708. The storage 722 may store instructions that may be executed by the processor 704 to perform a task.

The storage 722 can include an audio input detector 724 to detect audio input. The storage 722 can include an image input detector 726 that can detect image input. The storage 722 can include an output object printer 728 to print an output object. In an example the audio input is detected a microphone and the image input is detected by a camera, and both used to provide a content section of the output object, providing the user setting, and providing instructions to the printer for the content section of the output object to be printed.

In an example the processor 704 is to execute instructions to identify a situational context based on the image input. A situational context may be, in an example, that a barcode is seen by the camera. From this example input, the "barcode" would identify the situational context as a storefront context the user settings could be adjusted accordingly to reflect the settings of that specific commercial establishment. Thus, once a situation context is determined, a printer may be able to determine a user setting in response to the audio input and the situational context.

In an example, the printer may identify a situational context based on the audio input. In response to the identified situational context, the content section and user setting are provided by the processor. In an example, the audio input could be "print me 10 business cards fast" the contextual information would include the fact that you would like user settings adjusted to reflect the business situational context, and also that the modifier fast would indicate settings to be at the fastest possible speed. In an example, the user setting may include a default setting that is applied to the content section. In this example, the user setting provided via audio input may also include a modified setting in response to a detection that the audio input instruct an update to the user setting to be used for printing. In this way default settings may be updated and potentially saved for future use.

In an example, the content section of an output object including a graphic in response to the audio input and image input, wherein the graphic is retrieved from the memory device in response to a detection that the memory device contains the graphic, and a request for the graphic is sent to a network through a network interface in response to a determination that the graphic is not stored in the memory device. In an example, the instructions computing device for printing may print a value of a key-value pair in response to a detection of a key in the audio input recorded by a microphone.

In an example, the content section of an output object reproduces at least part of the image input. The content section of the output object can include translated text from at least one of the image input and the audio input. The output object may also include a numerical value calculated from an input value detected in at least one of the image input and the audio input. In another example, the content section can be generated based on results received from a network, the results related to an item detected in the image input. The image could include a coffee mug, and in response, the system may add the image or another image featuring a coffee mug or other coffee themed item with the output object.

In an example, if a computing device includes wireless connectivity through Wi-Fi the printer can then retrieve images from the web in order to supplement the output object for printing. In an example, the camera or image input detector may understand and identify the context for the label. A user can simply take a picture of the object for the printer to understand purpose of label without audio input. This can involve item identification with or without coded images such as QR codes or barcodes. For example, if image recognition recognized a jar of beans from an image of the beans taken by the camera, the printer could print a label for that particular food item. For example, the user could take a picture of coffee, and the label can be printed from that. As more thoroughly discussed above, with cloud connectivity, the printer could remember a user's favorite settings, make recommendations of preferences of users-like-me for example and remember personal information settings.

It is to be understood that the block diagram of FIG. 7 is not intended to indicate that the computing device 702 is to include all of the components shown in FIG. 7. Rather, the computing device 702 can include fewer or additional components not illustrated in FIG. 7.

Figure 8:
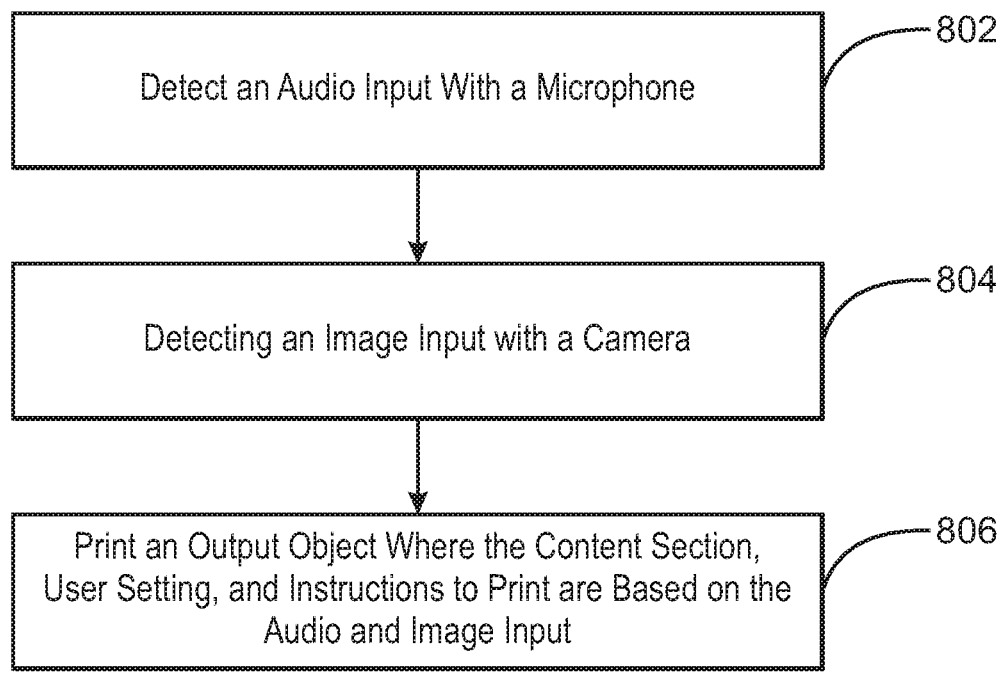
FIG. 8 is a flowchart of an example method for responsive printing.

FIG. 8 is a flowchart of an example method for responsive printing. At block 802, an audio input is detected with a microphone. At block 804, an audio input is detected with a microphone. At block 806, the method and output object is printed where the content section, user setting, and instructions to print are based on the audio and image input. In an example, the audio input is detected a microphone and the image input is detected by a camera, and both used to provide a content section of the output object, providing the user setting, and providing instructions to the printer for the content section of the output object to be printed. The content section may reproduce at least part of the image input or includes translated text from at least one of the image input and the audio input.

In an example the processor is to execute instructions to identify a situational context based on the image input. A situational context may be, in an example, that a barcode is seen by the camera. From this example input, the "barcode" would identify the situational context as a storefront context the user settings could be adjusted accordingly to reflect the settings of that specific commercial establishment. Thus, once a situation context is determined, a printer may be able to determine a user setting in response to the audio input and the situational context.

In an example, the printer may identify a situational context based on the audio input. In response to the identified situational context, the content section and user setting are provided by the processor. In an example, the audio input could be "print me 10 business cards fast" the contextual information would include the fact that you would like user settings adjusted to reflect the business situational context, and also that the modifier fast would indicate settings to be at the fastest possible speed. In an example, the user setting may include a default setting that is applied to the content section. In this example, the user setting provided via audio input may also include a modified setting in response to a detection that the audio input instruct an update to the user setting to be used for printing. In this way default settings may be updated and potentially saved for future use.

In an example, the content section of an output object including a graphic in response to the audio input and image input, wherein the graphic is retrieved from the memory device in response to a detection that the memory device contains the graphic, and a request for the graphic is sent to a network through a network interface in response to a determination that the graphic is not stored in the memory device. In an example, the instructions computing device for printing may print a value of a key-value pair in response to a detection of a key in the audio input recorded by a microphone.

In an example, the content section of an output object reproduces at least part of the image input. The content section of the output object can include translated text from at least one of the image input and the audio input. The output object may also can include a numerical value calculated from an input value detected in at least one of the image input and the audio input. In another example, the content section can be generated based on results received from a network, the results related to an item detected in the image input. For example, if a computing device includes wireless connectivity through Wi-Fi the printer can then retrieve images from the web in order to supplement the output object for printing.

In an example, the camera or image input detector may understand and identify the context for the label. A user can simply take a picture of the object for the printer to understand purpose of label without audio input. This can involve item identification with or without coded images such as QR codes or barcodes. For example, if image recognition recognized a jar of beans from an image of the beans taken by the camera, the printer could print a label for that particular food item. For example, the user could take a picture of coffee, and the label can be printed from that. As more thoroughly discussed above, with cloud connectivity, the printer could remember a user's favorite settings, make recommendations of preferences of users-like-me for example and remember personal information settings.

It is to be understood that the block diagram of FIG. 8 is not intended to indicate that the method 800 is to include all of the actions shown in FIG. 8. Rather, the method 800 can include fewer or additional components not illustrated in FIG. 8.

Figure 9:
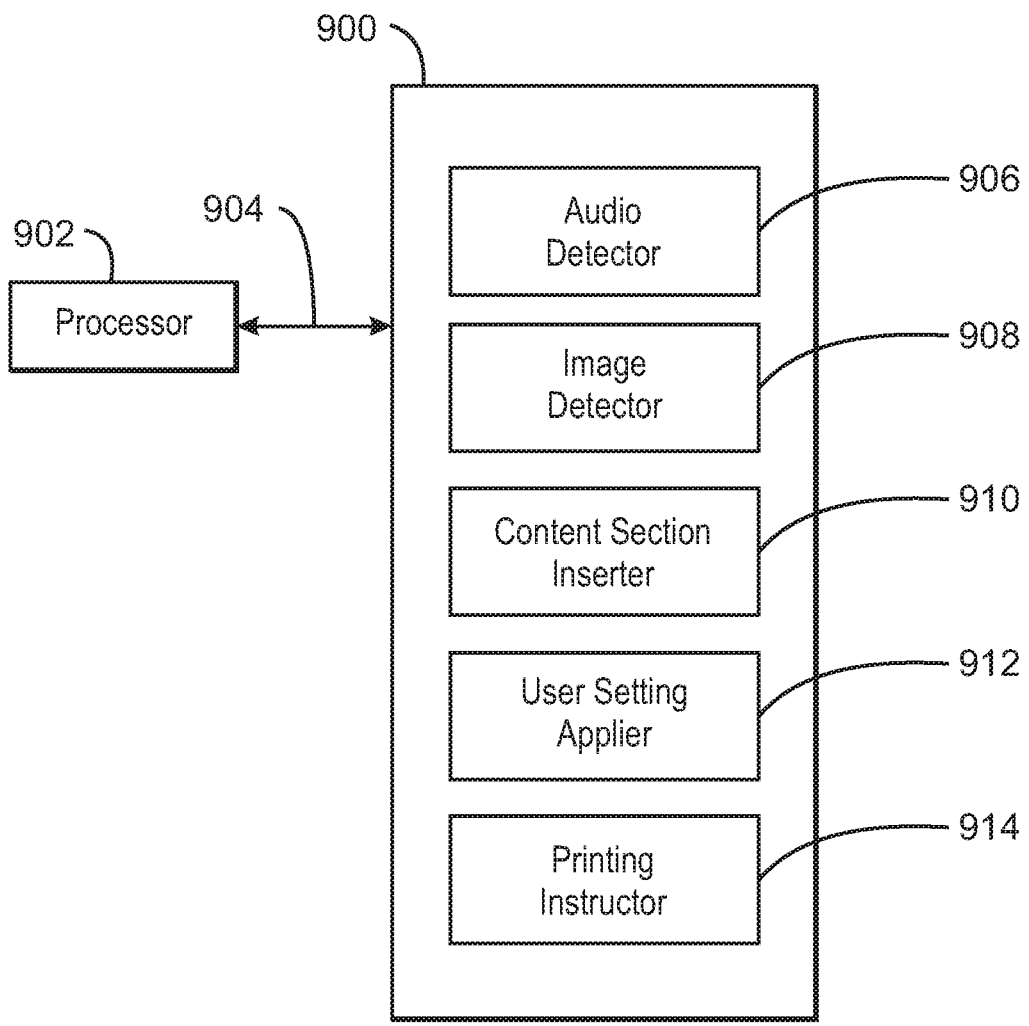
FIG. 9 is a block diagram of an example non-transitory, computer-readable medium including instructions to direct a processor for responsive printing.

FIG. 9 is a block diagram of an example non-transitory, computer-readable medium including instructions to direct a processor for responsive printing. The computer readable medium 900 may include the storage 722 or the memory 708 of FIG. 7 and other suitable formats readable by the computing device. The computer readable medium 900 can include the processor 902 to execute instructions received from the computer-readable medium 900. Instructions can be stored in the computer-readable medium 900. These instructions can direct the processor 902 for responsive printing. Instructions can be communicated over a bus 904 as electrical signals, light signals, or any other suitable means of communication for transmission of data in a similar computing environment.

The computer-readable medium 900 includes an audio detector 906 to detect audio input, an image detector 908 to detect an image input. The computer-readable medium 900 includes a content section inserter 910 to insert a content section into an output object for printing based on the audio input, the image input, and a contextual situation identified based on the audio input and the image input. The computer-readable medium 900 includes a user setting applier 912 to apply a user setting to the content section of the output object based on the audio input and the image input. The computer-readable medium 900 includes a printing instructor to instruct a printer to print the output object based on the audio input.

It is to be understood that the block diagram of FIG. 9 is not intended to indicate that the computer-readable medium 900 is to include all of the components shown in FIG. 9. Rather, the computer-readable medium 900 can include fewer or additional components not illustrated in FIG. 9.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. A responsive printing device comprising:
   a processor;
   a memory device;
   a printer for physical printing of a content section of an output object following a user setting and an instruction for the output object to be printed;
   a microphone to detect an audio input;
   a camera to detect an image input; and
   wherein the image input detected by the camera and the audio input detected by the microphone are used by the processor executing instructions from the memory device in providing a content section of the output object, providing the user setting, and providing instructions to the printer for the content section of the output object to be printed,
   wherein the content section does not include any image input detected by the camera,
   and wherein the instructions comprise identification of a situational context based on the image input, and the user setting is provided based on the audio input in relation to the situational context identified based on the image input.

2. The device of claim 1, wherein the user setting includes a default setting that is applied to the content section, and where the user setting includes a modified setting in response to a detection that the audio input instruct an update to the user setting in relation to the situational context identified based on the image input.

3. The device of claim 1, wherein the instructions include an instruction to print a value of a key-value pair in response to a detection of a key in the audio input recorded by the microphone.

4. The device of claim 1, wherein the content section includes translated text from the audio input.

5. The device of claim 1, wherein the content section is generated based on results received from a network, the results related to an item detected in the image input.

6. A method for responsive printing comprising:
detecting an audio input with a microphone;
detecting an image input with a camera; and
printing, with a printer, an output object including a content section following a user setting, wherein the content section of the output object is identified based on the image input but does not include any image input detected with the camera, wherein the printer prints the output object according to instructions based on a situational context identified based on the image input, and wherein the user setting is provided based on the audio input in relation to the situational context identified based on the image input.

7. The method of claim 6, wherein the content section includes translated text from the audio input.

8. The method of claim 6, wherein the situational context comprises location identified based on the image input, and the user settings are adjusted to reflect settings of an entity at the location.

9. A non-transitory computer-readable medium for responsive printing comprising instructions which, in response to execution on a processor, cause the processor to:
detect an audio input originally obtained with a microphone;
detect an image input originally obtained with a camera; and
insert a content section into an output object for printing based on the audio input and a contextual situation, the contextual situation identified based on the image input, the content section not including any image input obtained with the camera;
apply a user setting to the content section of the output object based on the audio input in relation to the contextual situation identified based on the image input; and
instruct a printer to print the output object based on the audio input.

10. The non-transitory computer-readable medium for printing of claim 9, wherein the content section includes numerical values calculated from an input values detected in at least one of the image input and the audio input.

11. The non-transitory computer-readable medium of claim 9, wherein the content section of the output object includes translated text from the audio input.

* * * * *